March 13, 1934. A. L. DUNCAN 1,950,718
FRUIT PEELING, STEMMING, HALVING, AND TRIMMING METHOD AND APPARATUS
Filed April 4, 1927 4 Sheets-Sheet 1

Fig. 1

Inventor
Arthur L. Duncan
By William A. Strauch
Attorney

March 13, 1934. A. L. DUNCAN 1,950,718
FRUIT PEELING, STEMMING, HALVING, AND TRIMMING METHOD AND APPARATUS
Filed April 4, 1927 4 Sheets-Sheet 3

Fig. 3

Inventor
Arthur L. Duncan
William A. Strauch
Attorney

March 13, 1934.  A. L. DUNCAN  1,950,718
FRUIT PEELING, STEMMING, HALVING, AND TRIMMING METHOD AND APPARATUS
Filed April 4, 1927  4 Sheets-Sheet 4

Patented Mar. 13, 1934

1,950,718

UNITED STATES PATENT OFFICE

1,950,718

FRUIT PEELING, STEMMING, HALVING, AND TRIMMING METHOD AND APPARATUS

Arthur L. Duncan, Piedmont, Calif., assignor, by mesne assignments, to California Packing Corporation, San Francisco, Calif., a corporation of New York Application April 4, 1927, Serial No. 180,824

39 Claims. (Cl. 146—43)

The present invention relates to improvements in fruit peeling, stemming, halving, and trimming methods and apparatus. More particularly the invention relates to automatic methods of peeling, stemming, halving, and trimming fruit, such as pears, and the like. To prepare fruit such as pears for high grade canning, it is the practice to pare and halve the fruit, to trim the blossom and stem ends from the remaining pulp sections, to stem the fruit or remove the fibrous sections remaining in the pear halves and extending from the stem and blossom end to the core, and to then remove the core containing the seeds.

Heretofore it has been customary to pare fruit in one of two ways. The method most commonly used is to remove the peel in slabs or strips by means of a knife that may or may not be provided with a guard to determine the depth of the cut. Such strips have been removed either by cutting from the blossom toward the stem end of the fruit or vice versa, or by cutting around the fruit, generally on a helical path. The other method included the disintegration of the skin of the fruit, by steam, hot lye, or hot water, and the subsequent removal, as by washing, of the disintegrated skin. The latter method causes practically no waste, but some fruit, such as pears, have skins that do not readily disintegrate when subjected to the action of the agents usually employed for this purpose. Pears have accordingly heretofore been generally pared by the cutting method first referred to, a knife guard being used to regulate the depth of the cut. The fruit is irregular in diameter and has numerous surface protuberances and depressions. Such irregularities necessitated an adjustment of the guard to give a cut of sufficient depth to remove all of the skin, resulting in a large waste of the flesh of the pear, and causing readily discernible ridges parallel to the direction in which the skin was removed. Such ridges appearing in high grade canned fruit are objectionable and lower the grade of the fruit and the price that can be secured for it on the market.

After the fruit has been pared, it has heretofore been the practice to halve the fruit, remove the core, stem, and fibrous section, and to trim the blossom and stem ends from the pulp halves by hand, necessitating a substantial amount of labor which renders the preparation of pears for canning purposes an expensive operation.

A primary object of the present invention is to provide novel mechanisms and methods for peeling, stemming, halving, and trimming fruit such as pears automatically, and with a minimum of labor.

A further object of the invention is to provide methods and apparatus for substantially continuously and automatically peeling, halving and trimming pears in uniform manner, permitting the division of the core from the flower end of the fruit and thereby preparing the fruit halves for handling in automatic coring machines. Pear halves treated in accordance with the present invention may be fed substantially continuously to my improved automatic coring machines, and uniformly treated high grade fruit halves may be continuously delivered to the filling and canning machines with minimum labor and cost of handling.

Further objects of the invention are such as will appear in the following detailed description of preferred embodiments thereof, and are such as may be attained by a utilization of the various combinations, sub-combinations, and principles hereinafter set forth, and as defined by the terms of the appended claims.

Figure 1:
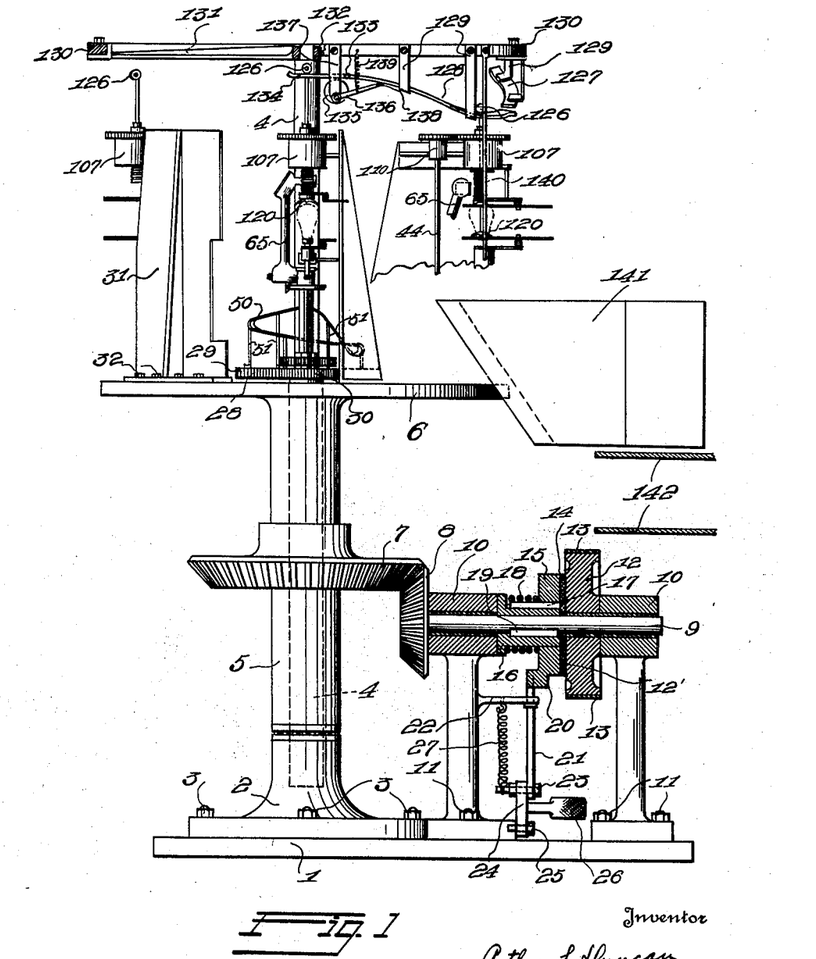
Figure 1 is a front elevation partially in section showing a preferred embodiment of the invention.

Referring to Figure 1, a suitable base plate 1 is provided on which a foot pedestal 2 is secured by means of the securing studs 3. Rigidly secured in the foot pedestal 2 is the bottom of vertically extending supporting post 4. Mounted for rotation on post 4 is sleeve section 5 of rotatable table 6. A thrust bearing of any suitable construction surrounds the post 4 and is interposed between the upper end of foot pedestal 2 and the lower end of sleeve 5.

Keyed to and driving sleeve 5 is a bevel gear 7 which meshes with and is driven by bevel pinion 8 which in turn is secured to the inner end of shaft 9. Shaft 9 is journaled in bearings 10 which are secured by means of bolts or studs 11 to base casting 1. Rotatably mounted on shaft 9 is a driving pulley 12 which may be driven from any suitable prime mover by means of the driving belt 13. Formed on the inner side surface of the pulley 12 is a friction driving surface 12' against which disk 14 of friction material is pressed by the friction clutch member 15. Clutch member 15 is slidably keyed to driving sleeve 16 by means of a key 17, and is forced to the right in Figure 1 by means of compression spring 18 interposed between the side of clutch member 15 and an end flange of sleeve 16. Sleeve 16 is mounted on shaft 9 and is keyed thereto by means of a key 19. Formed integrally with clutch member 15 is a stop projection 20 which is adapted to engage the upper end of a stop plunger or rod 21. Rod 21 is guided for vertical reciprocation in a slightly elongated guide slot formed in extension 22 of the inner bearing 10, and is provided with an enlarged section adapted to engage extension 22 limiting the upward movement of rod 21. At its lower end rod 21 is pivotally secured by means of pin 23 to the upper end of an inclined actuating lever 24 which at its lower end is pivotally supported on a pin 25 threaded into the base of inner bearing 10. Formed integrally with lever 24 is a foot treadle section 26, on which the foot of the operator is adapted to be placed. A spring 27 secured to the inner end of pin 23 to extension 22 normally forces link 24 together with the stop plunger 21 upward, holding the upper end of plunger 21 in the path of rotation of stop-projection 20 of the clutch member 15.

In operation of the mechanism so far described, pulley 12 is normally driven by belt 13. With the parts as shown in Figure 1, stop projection 20 will engage the upper end of plunger 21 preventing rotation of clutch member 15 and shaft 9, and table 6 will remain at rest. To start operation, the operator depresses momentarily treadle 26, and lever 24 together with plunger 21 are moved downward against the tension of spring 27 until the upper end of plunger 21 is disengaged from stop projection 20 freeing clutch member 15 for rotation. Immediately after clutch member 15 starts into rotation, treadle 26 is released and spring 27 will move the treadle and plunger 21 to their upper position as shown in Figure 1. Clutch member 15, together with the shaft 9 and pinion 8 will then be driven through a complete revolution and brought to rest when stop member 20 again engages the upper end of plunger 21. It will accordingly be seen that for each operation of the treadle 26 a complete revolution of clutch member 15, shaft 9, and the pinion 8 is permitted and the parts are then brought to rest. As shown, gear 7 and pinion 8 are so proportioned that for each revolution of shaft 9, gear 7 and table 6 will be turned through one-third of a revolution. It will accordingly be seen that an intermittent step by step rotation of table 6 under the control of the operator is provided. While a single revolution friction clutch has been disclosed, it will be understood by those skilled in the art that any well known type of single revolution clutch may be substituted therefor, or if desired table 6 may be rotated by any well known form of intermittent mechanism, such for example as a mutilated gear or a Geneva gear drive, driven through a disconnecting clutch permitting the operator to bring the entire mechanism to rest at will.

Secured to post 4 just above the upper surface of table 6 is a stationary mutilated gear 28 (Figures 1 and 2) the teeth 29 of which are adapted to mesh with and drive mutilated drive pinions 30 of peeling, stemming, and trimming units which are secured to table 6.

Each of the units comprises a supporting casting 31 bolted to table 6 by means of the bolts 32. As shown in detail in Figures 3 and 4, mutilated pinions 30 are secured to the lower end of vertically disposed shaft 33. Secured to and driven by shaft 33 is a gear 34, shaft 33 and gear 34 being intermittently rotated by the action of gear 28 and pinion 30 in operation of the mechanism. Shaft 33 is journaled for rotation in bearing section 35 of a supporting bracket 36 which is secured by means of bolts 37 to a suitable securing pad formed on the supporting casting 31. The upper end of shaft 33 is journaled in bearing section 39 of bracket 40 which is secured to a suitable pad formed on supporting casting 31 by the bolts 41. Journaled in bearing sections 42 and 43 of brackets 40 and 36 respectively, is a vertical drive shaft 44, the lower end of which is secured to driving pinion 45. Driving pinion 45 meshes with and is driven by driving gear 34. Mounted for reciprocation on shafts 33 and 44 is a carriage 46. Threaded in boss 47 of the carriage 46 is supporting pin 48 on which cam roller 49 is rotatably mounted. Cam roller 49 rides on cam track 50 which in turn is supported from stationary gear 28 by means of brackets 51.

Slidably keyed to and driven by shaft 44 is a bevel gear 53 which is journaled for rotation in bushing 54 of bearing section 55 of carriage 46, and is secured on the carriage by means of threaded collar 56 so that as carriage 46 reciprocates gear 53 will slide along shaft 44. Supported in a suitable bore formed in bearing section 55 (Figure 4) and extension 57 of carriage 46 is a spindle 58 on which the bevel pinion 59 meshing with bevel gear 53 is journaled for rotation. Secured on and driven by a tubular extension of bevel pinion 59 is a bevel gear 60 which meshes with and drives a bevel pinion 61. Pinion 61 in turn is secured to the end of and drives shaft 62 journaled for rotation in yoke 63 and cutter head 64 of the swinging arm 65. Yoke 63 is provided with the bearing sections 65 and 66 pivotally mounted on spindle 58. Secured to the projecting end of spindle 58 is the end of a helical spring 67, the body of which is coiled around spindle 58 and the inner end of which is hooked under arm 66 of yoke 63 tending to raise arm 65 counter-clockwise in Figure 3 against the action of gravity. A set screw 69 threaded into extension 57 of carriage 46 holds spindle 58 normally in fixed position. By loosening screw 69, and freeing spindle 58 for rotation, coil spring 67 may be adjusted to exert any desired lifting effect on arm 65 to adjust the pressure with which the peeling cutter bears against the fruit to be peeled.

Figures 4, 4A:
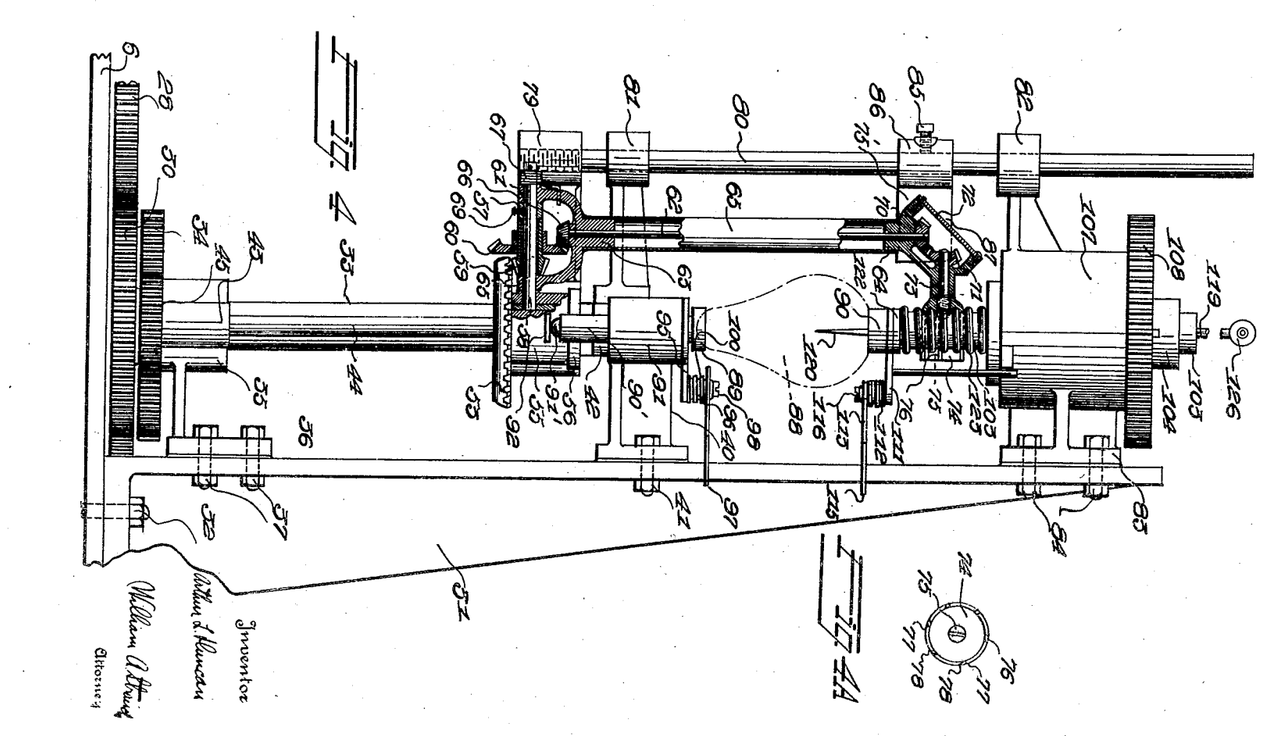
Figure 4 is an end view of the form of invention shown in Figure 3.
Figure 4a is an end view of the cutter shown in Figure 4.

Secured to the upper end of shaft 62 in a gear receiving recess of cutter head 64 is bevel gear 70 which meshes with pinion 71. The gear receiving recess in the cutter head 64 is closed by a suitable removable cover plate 72 providing ready access to gears 70 and 71. Pinion 71 drives a cutter spindle 73 to the end of which rotary cutter 74 is removably secured by a set screw 75. A suitable guard 75' is provided for the cutter. Cutter 74 is in the form of an open ended cylinder slotted as at 76 (Figures 4 and 4A) to provide a plurality of cutting edges. The cutting edges are beveled as shown at 77 and the adjacent edges are also beveled as shown at 78 (Figure 4A). As will readily be understood the edges 77 and 78 determine the depth of the cut that will be made as the cutter travels over the fruit to be peeled.

Figures 2, 5, 6, 7, 8, 9, 10:
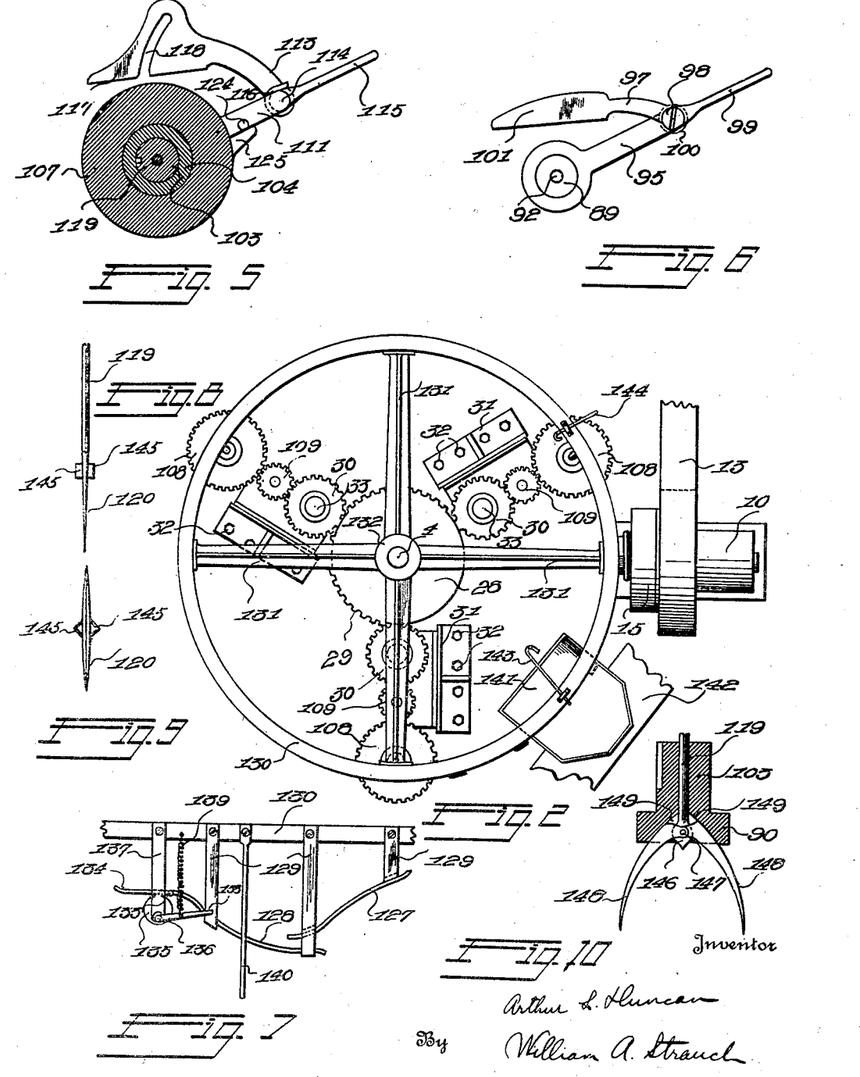
Figure 2 is a plan view of the form of invention shown in Figure 1.
Figure 5 is a sectional view taken along line 5—5 of Figure 3, showing the blossom end trimming knife.
Figure 6 is a sectional view taken along line 6—6 of Figure 3, showing the stem end trimming knife and discharge member.
Figure 7 is a fragmental developed view showing the halving knife actuating cam arrangement.
Figure 8 is a detailed fragmental end view showing the construction of a stemming and halving knife, for use in the invention.
Figure 9 is a bottom view of the knife shown in Figure 8.
Figure 10 is a fragmental sectional view showing a modified form of halving knife for use in the invention.
Figure 3:
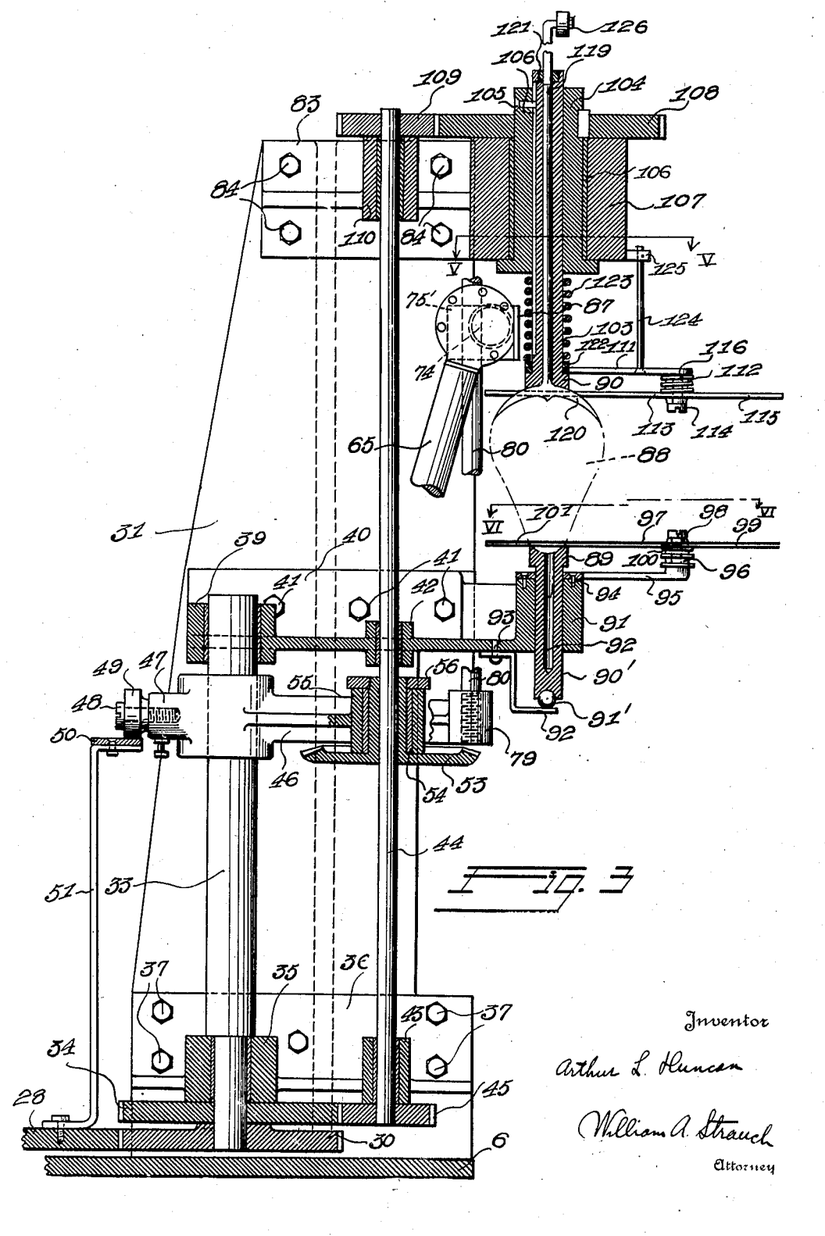
Figure 3 is a vertical sectional view of a preferred arrangement of a peeling, halving and trimming mechanism.

Threaded into extension 79 of carriage 46 is a rest rod 80 which is slidably guided in suitable bores formed in extensions 81 and 82 of supporting brackets 40 and 83 respectively. Bracket 83 is secured to the upper end of supporting casting 31 by means of securing bolts 84. Secured to guide rod 80 between guide projections 81 and 82 by means of a set screw 85 is a cutter rest member 86. Rest member 86 is provided with a shelf 87 on which cutter head 64 is adapted to rest, as the carriage 46 and parts carried thereby move vertically. As the carriage 46 moves downward cutter 74 passes over a pear or fruit 88 held between the lower and upper supporting cups 89 and 90. (Figures 3 and 4.) Lower cup member or holder 89 is carried by a sleeve 90' rotatably mounted in extension 91 of bracket 40. Formed in sleeve 90' is a stem receiving recess 92 into which the stem of the fruit fits, and the lower end of sleeve 90' is provided with a spherical seat which rests on a ball 91'. Ball 91' is carried on a supporting member 92 secured to bracket 40 by means of screws 93. Secured to bearing extension 91 by means of screws 94 is a trimming knife supporting member 95 (Figures 3, 4 and 6) provided with a supporting boss 96 to which the stem and lower trimming knife and discharge member 97 is pivotally supported by means of pin 98. Member 97 is provided with an operating extension 99 and is normally held in the position shown in Figure 6 by means of a spring 100 coiled around boss 96 with the lower end secured to the member 95 and the upper end secured to member 97. Member 97 is provided with a stem end trimming knife 113. Upper cup or holder member 90 is formed on the end of a sleeve 103, slidably supported in driving sleeve 104 (Figure 3). Secured in sleeve 104 is a driving pin 105 which extends into keyway 106 formed in sleeve 103. Sleeve 104 is journaled for rotation in bearing section 107 of upper bracket 83 and is driven by a gear 108 keyed thereto. Gear 108 meshes with a pinion 109 mounted on the shaft 44, the upper end of which extends through and is journaled in bearing section 110 of bracket 83. Rotatably supported on sleeve 103 is the blossom end knife supporting member 111 (Figures 3 and 5) provided with a boss 112 to which the blossom end trimming knife 113 is pivotally secured by screw 114. Knife 113 is provided with an actuating extension 115 and is normally held in the position shown in Figure 5 by the action of spring 116 coiled around the boss 112 with its upper end secured to knife 113 and its lower end secured to supporting member 111. Formed on knife 113 is the cutting blade 117 adapted to trim the blossom end of the fruit, and formed in blade 117 is a curved slot 118 to clear the actuating stem 119 of the halving and holding knife 120 which is slidably mounted in a suitable bore formed in the center of sleeve 103. The upper section of stem 119 is rectangular and fits slidably in a rectangular hole formed centrally in a driving screw plug 121 threaded into the end of sleeve 103.

Surrounding sleeve 103 and interposed between the lower end of sleeve 104 and a disk of friction material 122 slidably mounted on the sleeve 103 is a helical spring 123 which yieldingly forces disk 122 into engagement with the knife supporting member 111. Spring 123 performs the double function of forcing sleeve 103 together with the holding member 90 and halving knife 120 yieldingly downward in engagement with the fruit to be peeled and at the same time establishes a frictional driving connection between sleeve 103 and the knife supporting member 111. Accordingly, as sleeve 103 rotates in a clockwise direction in Figure 5 in operation of the device, supporting member 111 will be rotated until the stop pin 124 secured thereto abuts against stop projection 125 of the journal member 107 of bracket 83.

Rotatably secured to the upper end of the stem 119 is a cam roller 126 which in operation of the device is adapted to successively engage cam track sections 127 and 128 (Figures 1 and 7) to actuate the halving knife 120 as will more fully hereinafter appear. Cam tracks 127 and 128 are supported by brackets 129 from a stationary supporting ring 130, which in turn is supported from the top of post 4 by the arms 131 of a supporting casting 132. Pivoted at 133 to the end of the track section 128 is a track section 134. Track section 134 is normally held in substantially horizontal position by a cam 135 which is pivotally mounted on a spindle 136 supported from ring 130 by means of the bracket 137. Secured to spindle 136 is an actuating handle 138 which is normally held in its uppermost position as shown by the action of spring 139 interposed between the handle 138 and ring 130.

Secured to and depending from ring 130 is a trimming knife actuating member 140 which in operation of the device is engaged by extensions 99 and 115 of trimming members 97 and 113, to actuate the trimming knives as will more fully hereinafter appear. Disposed beneath actuating member 140 and in a position to catch the fruit halves as they are discharged from the machine is a hopper 141 diagrammatically indicated in Figures 1 and 2, in which the fruit sections are caught and may be discharged on a conveyor belt 142. To aid in the discharge of the fruit sections from the machine, a blast of air may be directed against the fruit halves from a nozzle 143 (Figure 2) as the trimming knives pass actuating member 140, to blow the fruit sections and adhering peelings outward from the machine into hopper 141 of the conveyor 142. A washing spray arrangement indicated diagrammatically at 144 (Figure 2) may also be provided if desired to wash the peeling from the pears.

In operation of the mechanism so far described, with the parts at rest, a unit will be located at the feeding station beneath track section 134 (Figure 1). The operator inverts a pear, entering the stem into recess 92 (Figure 3) of holding member 89 with the center of the pear substantially in alignment with the impaling projection of halving knife 120. The operator then rotates handle 138 clockwise in Figure 1, rotating the cam 135 and permitting the spring 123 surrounding the sleeve 103 of the unit at the feeding station or first unit, to force sleeve 103 together with holding member 90 and halving knife 120 downward until knife 120 is forced into the blossom end and member 90 is seated against the flesh of the pear as shown in Figures 3 and 4. The pear will then be gripped firmly between the holding members 89 and 90, and with the handle 138 held downward the operator depresses foot treadle 26 freeing clutch member 15 for a single revolution. Rotation of clutch member 15 drives table 6 through the first stage of its cycle of operation. As soon as rotation of table 6 starts the teeth of the mutilated driving pinions 30 mesh with the first series of teeth 29 of the mutilated stationary gear 28, rotating shaft 33. During the first stage of movement of table 6 gear 30 will make a complete revolution, and just before the table comes to rest, the smooth locking surface of the mutilated gear 28 bringing the shaft 33 and the parts driven thereby to rest and locking them just before the table comes to rest. During this stage of operation shaft 33 will drive shaft 44 through gears 34 and 45. Shaft 44 through the gears 53, 59, 60 and 61, shaft 62, and gears 70 and 71 drives rotary cutter 74 at a high speed, and through gears 108 and 109 rotates sleeve 104 together with the holder 90 and the fruit slowly in a right-hand direction. At the same time roller 49 of carriage 46 will move gradually down the inclined section of cam track 50, causing carriage 46 together with cutter 74 to move downward approximately one-half the total downward movement of the carriage before the parts again come to rest at the end of the first revolution of the clutch member 15 and first stage of operations. The weight of parts may be made sufficient to move the carriage and cutter downward, or if desired a spring may be used to force the parts downward in obvious manner. As the cutter 74 moves downward, the cutter head 64 will remain against the rest shelf 87 until the cutter strikes the flesh of the pear. Then as the cutter moves downward, arm 65 will swing outward about spindle 58 as a pivot, (see Figure 4), and the cutter will ride over the surface of the pear, following the contour of the fruit and removing the peel in thin comminuted pieces. The parts and gearing are so proportioned that during the downward movement of the cutter the skin or peel will be completely removed in a winding or helical path without substantial waste of useful fruit pulp. At the end of the first stage of operation a second unit will be positioned at the feeding station, and another pear is inserted as above set forth. Clutch member 15 is again released for a second revolution and the table 6 will turn a third of a revolution through the second stage of operation of the first unit. During this movement of the table the upper section of the pear inserted in the second unit will be peeled as above set forth. Immediately after the table starts in rotation the mutilated pinion 30 of the first unit will mesh with the second series of teeth 29 of gear 28 turning shaft 33 through a second revolution, and carriage 46 will complete its downward movement guided by cam track 50 carrying rotating cutter 74 downward over the lower section of the pear and completing the peeling operation. Just before the end of the second stage of operation the locking sections of pinions 30 will engage the smooth locking surfaces of gear 28, bringing both trimming parts to rest and locking them just before the table 6 comes to rest at the end of its second stage of operation. The pear in the first unit will now be completely peeled with cutter 74 in its lowest position, and the pear and first trimming unit may be subjected to a washing spray from nozzle 144 to wash the comminuted peeling sections away. The third unit will now be in front of the peeling station and a pear is inserted as above set forth, and clutch member 15 is released for its third revolution, completing the third stage of operation of the first unit and table 6 will be rotated to the final third of a complete revolution. During this stage of operation pinion 30 will be locked against rotation. During the first part of the final movement of the table, cam track 50 is so shaped that it will hold carriage 46 and cutters 74 in their lower position and the actuating roller 126 for the halving knife 120 will engage the lower surface of cam track section 127 plunging knife 120 downward through the fruit, dividing it in half. Roller 126 will then pass from under cam 127 and will engage the upper surface of cam track 128, raising knife 120 slowly upward, the fruit halves being still gripped between the holding members 89 and 90. Immediately after the knife 120 is raised so that it may be cleared by knife 97, knife actuating extensions 99 and 115 are engaged by the actuating member 140, and knives 97 and 113 are thereby rocked about their pivot pins 98 and 114 respectively, swinging blades 101 and 117 inward into the flesh of the fruit.

The frictional coupling between the upper knife carrying member 111 and sleeve 103 is sufficient to hold stop pin 124 against the lug 125 as the knife 117 swings through the flesh of the fruit. As the movement of table 6 continues, slot 118 will pass around the stem 119 until the bottom of the slot 118 engages halving knife stem 119. When this occurs, rotation of arm 115 and knife 113 about pivot 114 no longer is possible, and as table 6 continues to rotate, a relative rotation of knife 113 about stem 119 occurs, severing the section of the fruit remaining uncut after the swinging movement of the knife about pivot 114 due to the presence of the slot 118 in the blade 117.

During the operation of the upper knife, lower knife blade 101 will have swung completely through the stem end of the fruit and the arms 99 and 115 will clear the actuating member 140 as soon as the stem and blossom ends of the fruit are severed. Springs 100 and 116 will then swing the knives 97 and 113 about the pivots 98 and 114 respectively, and the lower knife will immediately restore to the position shown in Figure 6. Stop 124 will, however, remain out of engagement with lug 125 until the rotation of sleeve 103 in the first stage of the succeeding operation, when it will again be brought into contact with the lug 125 as shown in Figure 5. After the ends have been trimmed from the fruit halves the fruit sections will fall from the mechanism into hopper 140.

During the operation of trimming knives 97 and 113, the movement of roller 126 and knife 120 will continue upward and immediately after the trimming knives swing outward, knife 120 will re-engage holding member 90, and further movement upward of the stem 119 will raise the holding member 90 and sleeve upward, compressing the spring 123. At the point where the fruit halves are freed, if desired, an air blast nozzle 143 may blow the fruit sections outward and also may be arranged to clear the machine of adhering peelings and pulp sections. Also if desired a cleaning spray of water may be directed on the fruit to wash it clear of the comminuted peeling sections at this point. After the fruit halves have been freed, cam roller 126 of the first unit will ride up on the track section 134 and the parts will finally come to rest with the first unit at the peeling station.

The fruit halves discharged into the hopper 141 may be dropped directly on a belt 142 and carried to a coring operator or coring and stemming machine. A cycle of operation has now been completed by the first unit, while the second and third units will be ready to enter the third and second stages respectively of their operations as above set forth, and the cycle of operations may be repeated in rapid succession. It will be seen that an automatic peeling, halving, and trimming mechanism has been disclosed in which the only labor required is the insertion of the fruit into the machine. While three units on a single rotating table have been described, it will be understood by those skilled in the art that as many units as desired may be utilized. If only one unit is utilized, it will be understood that the complete cycle of operation can be carried out in a single continuous revolution of the table 6.

In the form of invention so far described, no provision is made for stemming the fruit. As shown in Figures 8 and 9 by securing V-shaped stemming cutters 145 to opposite sides of the knife 120, as the knife 120 is forced downward through the fruit, V-shaped grooves will be cut into the fruit halves cutting the stem and fibrous sections therefrom.

Instead of using the rigid halving knife 120, a halving knife arrangement shown in Figure 10 may be utilized. In this form of the invention, a central impaling knife section 146 is formed on the end of the stem 119 and pivotally connected to the stem 119 by the pin 147 are the halving knife blades 148. Blades 148 are shaped to nest in grooves 149 cut into the cup section of the holder 90, in which position the ends of the knives will be brought towards each other so that when they are plunged into a pear they will be completely embedded in the fruit. As the stem 119 is forced downward through the fruit, blades 148 will leave the groove 149 and due to the resistance of the fruit will swing outward a limited amount about pivot 147 to halve the fruit. This form of halving knife is adapted to wider variation in fruit sizes than the knife 120.

It will be apparent to those skilled in the art that various other variations may be made in the details of my invention, without departing from the spirit thereof.

What I claim is:—

1. An automatic fruit peeling and halving machine, comprising means to support a plurality of peeling and halving mechanisms and a plurality of relatively movable fruit holding members, means to cause said supporting means to move in a predetermined path, and elements fixed with relation to said supporting means to control the position of said holding members and to independently actuate said peeling and halving means in succession as said supporting means moves along its predetermined path.

2. An automatic fruit peeling machine comprising a movable support, a plurality of peeling mechanisms mounted on said support, each mechanism including relatively movable holding members, means to bodily reciprocate said members, and a cutter relatively movable from end to end of the fruit to peel the fruit while held in said holding members, means to cause said support to move in a predetermined path, and elements fixed relative to said support to control the position of each of said holding members in succession and to successively actuate the reciprocating means and the cutter of said peeling mechanisms.

3. An automatic fruit peeling machine including a movable support, a plurality of sets of fruit holding members arranged in spaced relation on said support, said holding members being bodily movable with respect to said support in a direction transverse to the direction of movement of the support to move the fruit carried thereby in a predetermined path, cutters separate from said holding members arranged adjacent each set of members, means to move said support, and elements fixed relative to said support to move said members and cutters in their path of movement as the support is moved.

4. An automatic fruit peeling machine comprising a rotatable table, a plurality of sets of fruit holding members arranged in spaced relation on said table including a group of holding members mounted for reciprocation with respect to said table, cutters arranged to swing toward said members, means to rotate said table, and elements fixed with relation to said table to cause the reciprocation in succession of the members of said groups of holding members and the swinging of the cutters toward the holding members.

5. An automatic fruit peeling machine comprising a movable support, a plurality of fruit peeling mechanisms mounted on said support, each mechanism including a pair of fruit holding members, means to control one fruit holding member of each pair, means to reciprocate one of the holding members of each pair of holding members, and means to peel the fruit during the reciprocation of the reciprocating members, mechanism to move said support and the peeling mechanisms carried thereby, and fixed elements to successively operate said means as the support moves in a predetermined path.

6. An automatic fruit peeling machine comprising a movable support, a plurality of sets of peeling mechanisms on said support, each peeling mechanism including a rotating cutter having a plurality of cutting edges, and means to cause said cutter to move relative to the fruit and from end to end of the same, means to move said support, and stationary elements to actuate in succession each of the rotating cutters and the reciprocating means as the support moves in its predetermined path.

7. An automatic fruit peeling machine comprising a movable support, a plurality of sets of peeling mechanisms mounted in spaced relation on said support, each of said sets consisting of a fruit holding means, a fruit peeling means, and mechanism to reciprocate the holding means relative to the peeling means, mechanism to move said support and elements to cause the actuation of each of said sets in succession when said support is moved.

8. A machine of the class described including a rotatable table, a plurality of pairs of fruit holders on said table, one of the fruit holders of each pair being yieldably pressed toward its cooperating holder, a stationary cam track to separate said holders as the holders reach a feeding station, and manually operable means to move a portion of said track to permit the holding means to grip the fruit when a fruit is placed between a pair of said holders.

9. A machine of the class described including a rotatable table, a plurality of pairs of fruit holding members on said table, a halving knife arranged to reciprocate between each pair of holding members, knives to trim the stem and blossom ends of the fruit stationary cams to control the movement of said holding members and halving knives as the table rotates, and stationary means to cause the actuation of said trimming knives as the table rotates.

10. A machine of the class described including a rotatable table, a plurality of pairs of relatively movable fruit holding members on said table, a fruit halving knife for each pair of holding members, each knife engaging one of the fruit holding members, and stationary means to control the movement of said members and knives as the table rotates, said last named means including a pair of cam tracks engaged in succession by an element mounted to move as a unit with a halving knife, a portion of one of said tracks being manually releasable after the fruit is positioned in the holding members.

11. A machine of the class described comprising a rotatable table, a plurality of peeling mechanisms on said table, each mechanism including means to hold the fruit at its blossom and stem ends, a separate peeling cutter, and mechanism to move the fruit relative to the cutter, means to rotate said table, and elements to operate each of the peeling mechanisms successively and to actuate said peeling cutter in timed relation as the table is rotated.

12. A machine of the class described comprising a rotating table, a plurality of sets of fruit holders arranged in spaced relation on said table, and fruit trimming mechanism arranged in position to trim the fruit while held in said holders and during the rotation of said table and actuated by the rotation of the table.

13. A machine of the class described comprising a moving support, a plurality of sets of fruit holders arranged in spaced relation on said support, and fruit trimming knives arranged to be swung into position by the moving support to trim the fruit held in said holders.

14. A machine of the class described comprising a moving support, a plurality of sets of fruit holders arranged in spaced relation on said support, trimming knives pivotally mounted on said holders with their cutting edges arranged to swing relative to the fruit held in said holders, and means independent of said support to swing said knives about their pivots to trim the fruit as the holders move past said means.

15. A machine of the class described comprising a rotating table, a plurality of fruit holders on said table to carry said fruit in a predetermined path, trimming knives pivotally mounted on said holders and arranged to be swung relative to the fruit held in the holders, and means independent of the table to cause said knives to trim the fruit successively.

16. A machine of the class described, comprising a moving support, a plurality of fruit holders designed to engage the stem and blossom ends of fruit, trimming knives movably mounted on said holders with their cutting edges in position to cut off the stem and blossom ends of fruit held in said holders, thereby releasing the fruit from the holders, and stationary means cooperating with said knives to actuate them successively as the holders move past said means.

17. The combination defined in claim 16 including means arranged adjacent said stationary means to eject the fruit released by the trimming knives.

18. The combination defined in claim 16 including means to direct a blast of air to eject the trimmed fruit released by said holding means.

19. A machine of the class described comprising a movable support, a plurality of pairs of fruit holders including a yieldable holder carried by said support, means to separate said holders in succession as each pair of holders reaches a feeding station, and manually operable means to release said separating means after a fruit has been positioned in a pair of holders.

20. A machine of the class described comprising a movable support, a plurality of pairs of relatively movable fruit holders carried by said support, trimming means to sever the blossom and stem ends of the fruit carried by said holders, a halving knife carried by one holder of each pair of holders, and mechanism to successively actuate said holders, said mechanism serving to simultaneously control said trimming means and halving knife.

21. A pear trimming, halving, and peeling unit comprising a pair of holders designed to engage the stem and blossom end of a pear, means to cause the holders to yieldingly engage the pear and automatically adapt themselves to pears of different sizes, means to peel the pear while it is held in said holders, and halving and trimming mechanism to sever the blossom and stem ends of the fruit carried by said holders, whereby said mechanisms are brought into position by relative movement of the holders.

22. A pear trimming and halving unit comprising a pair of holders designed to engage the stem and blossom ends of a pear, means to yieldingly press one holder toward the other, said means permitting a substantial separating movement of the holders, a halving knife associated with one of said holders, trimming knives movably mounted on each of said holders, and means to actuate said trimming knives relative to the holders.

23. A pear trimming unit comprising a pair of holders designed to engage the blossom and stem ends of the fruit, said holders being yieldably mounted so that they are capable of a substantial separating movement to accommodate pears of differing sizes, and a pair of knives to trim said ends of the pears, one of said knives being carried by said holders whereby they are positioned thereby.

24. The combination defined in claim 23 in which the knives are pivotally mounted on the holders, one of said knives having a pivot that is bodily rotatable relative to the holder.

25. An automatic fruit machine comprising a rotatable table, a plurality of fruit holding and operating mechanisms each including rotating cutters separate from the fruit holding mechanism mounted on said table, means to intermittently rotate said table to bring said holding and operating mechanisms in succession to a feeding station, mechanism to cause the means that rotates the table to actuate said operating mechanisms in succession, and means to automatically eject the fruit from its holding mechanism before each holding and operating mechanism reaches said feeding station.

26. The combination defined in claim 25 in which the operating mechanism includes a rotating cutter having a plurality of cutting edges.

27. The combination defined in claim 25 in which the ejecting mechanism includes trimming knives that remove the portion of the fruit held in the holders, and an air blast nozzle to separate the fruit from the holders.

28. In an automatic fruit peeling, halving, and trimming machine, the combination of means for supporting the fruit including a holder for supporting the lower end of the fruit and a holder for engaging the upper end of the fruit, means for driving the supporting means, a halving knife associated with the upper holder, said halving knife operating to penetrate the upper end of the fruit when held between the holders, means for rotating the upper holder and halving knife to rotate the fruit, a rotary peeling cutter for engaging the side of the fruit with means for actuating the same, cutters for severing the ends of the fruit and mounted to swing through a path adjacent the inner ends of the holders, means for advancing and withdrawing the halving knife, and means for operating the trimming cutters simultaneously to sever both ends of the fruit.

29. In an automatic fruit peeling and halving machine, the combination of a movable support, holders mounted on the movable support for engaging opposite ends of the fruit to hold the same, means to actuate the movable support to move the fruit through a predetermined path, halving mechanism including a halving knife associated with one of the holders, means for rotating one of the holders to rotate the fruit, means distinct from the holders and having a cutter moving from end to end of the fruit for peeling the fruit as it rotates, relatively fixed means for actuating the last named means while the supporting means is moving the fruit through its predetermined path, and relatively fixed means operating after the fruit is peeled to effect the advance of the halving knife to halve the fruit.

30. In an automatic fruit peeling machine, the combination of a fixed frame, a movable support mounted on the frame, a plurality of peeling mechanisms, each peeling mechanism including a rotary peeling cutter and having a carriage mounted to slide on said movable support, a holding means for the fruit mounted on said movable support and corresponding to each peeling mechanism, each holding means comprising a relatively fixed holding member and a relatively movable holding member, means for moving said movable support in a predetermined path, means for holding each peeling cutter yieldingly against the side of the fruit, relatively fixed means on the frame for controlling the relative movable holding member, and relatively fixed means on the frame for effecting sliding movement of the peeling mechanism carriages while the movable support is moving to cause each rotary peeling cutter to move longitudinally of the fruit and peel the same.

31. In an automatic fruit peeling machine, the combination of a fixed frame, a rotary frame mounted on the frame, a plurality of peeling mechanisms, a guide post and a guide shaft corresponding to each peeling mechanism and supported on the rotary table, a carriage corresponding to each peeling mechanism movably mounted on the guide shaft and guide post, holding means for the fruit mounted on said rotary table and corresponding to each peeling mechanism, means for rotating the rotary table, each peeling mechanism including a swinging arm supported on its corresponding carriage, and a rotary peeling cutter carried by the arm, means for yieldingly holding the peeling cutter against the side of the fruit, means for moving each carriage actuated by the rotary movement of the rotary table, to cause the rotary peeling cutter to move along the fruit, and means driven by the said shaft for rotating the fruit during the peeling operation.

32. In an automatic fruit peeling machine, the combination of a fixed frame, a rotary frame mounted on the frame, a plurality of peeling mechanisms, a guide post and a guide shaft corresponding to each peeling mechanism and supported on the rotary table, a carriage corresponding to each peeling mechanism movably mounted on the guide shaft and guide post, holding means for the fruit mounted on said rotary table and corresponding to each peeling mechanism, means for rotating the rotary table, each peeling mechanism including a swinging arm supported on its corresponding carriage, and a rotary peeling cutter carried by the arm, means for yieldingly holding the peeling cutter against the side of the fruit, means for moving each carriage actuated by the rotary movement of the rotary table, to cause the rotary peeling cutter to move along the fruit, means mounted on the said shaft for driving the peeling cutter, and means driven by the said shaft for rotating the fruit during the peeling operation.

33. In an automatic fruit peeling machine, the combination of a fixed frame, a rotary table mounted on the frame, a plurality of peeling mechanisms, each peeling mechanism including a rotary peeling cutter and having a carriage movably mounted on said table, a holding means for the fruit mounted on said rotary table and corresponding to each peeling mechanism, means for rotating the rotary table, each peeling mechanism including an arm having a joint connection with its corresponding carriage and supporting a rotary peeling cutter, means supported on each arm for transmitting movement to the rotary peeling cutter, means for holding each peeling cutter yieldingly against the side of the fruit, and relatively fixed means on the frame for effecting movement of the peeling mechanism carriages while the rotary table is rotating, to cause each rotary peeling cutter to move longitudinally of the fruit and peel the same.

34. In an automatic fruit peeling machine the combination of a fixed frame, a rotary table mounted on the frame, a plurality of peeling mechanisms, each peeling mechanism including a rotary peeling cutter and having a carriage movably mounted on said table, a holding means for the fruit mounted on said rotary table and corresponding to each peeling mechanism, means for rotating the rotary table, each peeling mechanism including an arm having a joint connection with its corresponding carriage and supporting a rotary peeling cutter, means supported on each arm for transmitting movement to the rotary peeling cutter, means for holding each peeling cutter yieldingly against the side of the fruit, relatively fixed means on the frame for effecting movement of the peeling mechanism carriages while the rotary table is rotating to cause each rotary peeling cutter to move longitudinally of the fruit and peel the same, and relatively fixed means on the frame for driving the rotary peeling cutter as the table rotates.

35. In an automatic fruit peeling machine, the combination of a fixed frame, a rotary table mounted on the frame, a plurality of peeling mechanisms, each peeling mechanism including a rotary peeling cutter and having a carriage movably mounted on said table, a holding means for the fruit mounted on said rotary table and corresponding to each peeling mechanism, means for rotating the rotary table, each peeling mechanism including an arm having a joint connection with its corresponding carriage and supporting a rotary peeling cutter, means supported on each arm for transmitting movement to the rotary peeling cutter, means for holding each peeling cutter yieldingly against the side of the fruit, relatively fixed means on the frame for effecting movement of the peeling mechanism carriages while the rotary table is rotating, to cause each rotary peeling cutter to move longitudinally of the fruit and peel the same, relatively fixed means on the frame for driving the rotary peeling cutter as the table rotates, and a rest supported on each carriage for supporting the said arm when the rotary peeling cutter is not in contact with the fruit.

36. In an automatic fruit peeling machine, the combination of a fixed frame, a rotary table mounted on the frame, a plurality of peeling mechanisms, each peeling mechanism including a rotary peeling cutter and having a carriage movably mounted on said table, a holding means for the fruit mounted on said rotary table and corresponding to each peeling mechanism, means for rotating the rotary table, each peeling mechanism including a movable arm supported on its corresponding carriage, a rotary peeling cutter carried on the arm, means for transmitting movement through the arm to drive the rotary peeling cutter, means for holding each peeling cutter yieldingly against the side of the fruit and relatively fixed means on the frame for effecting the movement of the peeling mechanism carriages while the rotary table is rotating to cause each rotary peeling cutter to move longitudinally of the fruit and peel the same.

37. A pear trimming, halving, and peeling unit comprising a pair of holders designed to engage the stem and blossom end of a pear, means to cause the holders to yieldingly engage the pear and automatically adapt themselves to pears of different sizes, means to peel the pear while it is held in the said holders, a halving mechanism, and trimming mechanism to sever the blossom and stem ends of the fruit cooperating with the said holders, means for supporting and advancing said holders, and means for bringing said mechanisms into operation by the advancing movement of the holders.

38. In an automatic fruit peeling, halving and trimming machine, the combination of holding means to engage one end of the fruit, holding means to engage the other end of the fruit, one of said holding means having a halving knife associated therewith disposed diametrically of the axis of the fruit and cooperating with the holding means to hold the fruit, means to move all of said parts in a predetermined path, automatic means for advancing the halving knife through the fruit to halve the fruit, and automatic means for trimming both ends of the fruit following the halving operation and while the knife is passing through the fruit, said halving knife operating to assist in holding the fruit while the ends of the fruit are being trimmed.

39. An automatic fruit peeling machine comprising a rotatably mounted table, a plurality of sets of fruit peeling mechanisms, each of said mechanisms including a rotary cutter for removing the peel throughout the length of the fruit and having a plurality of cutting edges, said peeling mechanisms arranged in spaced relation around the edge of said table, holding means for the fruit distinct from the cutters, means to rotate said table, and stationary elements to cause rotation of said cutters in succession while the table is being rotated.

ARTHUR L. DUNCAN.